(12) United States Patent
Awashima et al.

(10) Patent No.: US 9,061,744 B2
(45) Date of Patent: Jun. 23, 2015

(54) WORKING SYSTEM FOR FLOATING STRUCTURE, FLOATING STRUCTURE, WORKING SHIP, AND WORKING METHOD FOR FLOATING STRUCTURE

(75) Inventors: Yuji Awashima, Tokyo (JP); Haruki Yoshimoto, Tokyo (JP)

(73) Assignee: JAPAN MARINE UNITED CORPORATION (JP)

( * ) Notice: Subject to any disclaimer, the term of this patent is extended or adjusted under 35 U.S.C. 154(b) by 198 days.

(21) Appl. No.: 13/811,158

(22) PCT Filed: Jul. 25, 2011

(86) PCT No.: PCT/JP2011/066872
§ 371 (c)(1),
(2), (4) Date: Feb. 20, 2013

(87) PCT Pub. No.: WO2012/011601
PCT Pub. Date: Jan. 26, 2012

(65) Prior Publication Data
US 2013/0152840 A1    Jun. 20, 2013

(30) Foreign Application Priority Data

Jul. 23, 2010  (JP) .................................. 2010-165889

(51) Int. Cl.
*F03D 11/04* (2006.01)
*B63B 35/44* (2006.01)
(Continued)

(52) U.S. Cl.
CPC ............... *B63B 35/44* (2013.01); *B63B 35/003* (2013.01); *F05B 2240/95* (2013.01); *F03D 1/001* (2013.01); *F03D 1/003* (2013.01); *B63B 35/00* (2013.01);
(Continued)

(58) Field of Classification Search
CPC ................... E02B 17/0047; E02B 2017/0091; E02B 17/08; B63B 35/003
USPC ................................... 405/203–209; 114/268
See application file for complete search history.

(56) References Cited

U.S. PATENT DOCUMENTS 4,829,924 A *  5/1989  Dysarz ............................ 114/32
8,313,266 B2 * 11/2012  Numajiri ...................... 405/204
(Continued)

FOREIGN PATENT DOCUMENTS

| EP | 1777348 A1 * | 4/2007 |
| JP | 2005-271673 | 10/2005 |

(Continued)

OTHER PUBLICATIONS

Office Action issued in counterpart Korean Patent Application No. 10-2013-7004329 on Apr. 11, 2014 consisting of 10 pp.
(Continued)

*Primary Examiner* — Sunil Singh
(74) *Attorney, Agent, or Firm* — Volpe and Koenig, P.C.

(57) ABSTRACT

A working system includes a floating type floating structure, and a working ship configured to perform at least installation or maintenance of the floating structure. The floating structure has a column section whose peripheral surface is located at a waterline when the floating structure is floating, a ballast section arranged below the column section and a flange section arranged at an intermediate portion of the column section. The working ship has a gripping section capable of engaging with the flange section, and a raising/lowering device configured to raise and lower the floating structure.

12 Claims, 16 Drawing Sheets

(51) Int. Cl.
*B63B 35/00* (2006.01)
*F03D 1/00* (2006.01)
*B63B 43/06* (2006.01)

(52) U.S. Cl.
CPC ............... *B63B 43/06* (2013.01); *Y02E 10/727* (2013.01); *B63B 2035/442* (2013.01); *B63B 2035/446* (2013.01)

(56) References Cited

U.S. PATENT DOCUMENTS

| | | | | |
|---|---|---|---|---|
| 2005/0286979 | A1* | 12/2005 | Watchorn | 405/224 |
| 2010/0316450 | A1* | 12/2010 | Botwright | 405/206 |
| 2011/0119889 | A1 | 5/2011 | Numajiri | |

FOREIGN PATENT DOCUMENTS

| | | | |
|---|---|---|---|
| JP | 2005271673 | A | 10/2005 |
| JP | 2009-013829 | | 1/2009 |
| JP | 2009013829 | A | 1/2009 |
| JP | 2009248792 | A | 10/2009 |
| WO | WO 0134977 | A1 * | 5/2001 |
| WO | 2010023743 | A1 | 3/2010 |

OTHER PUBLICATIONS

Office Action issued in corresponding Japanese Patent Application No. 2010-165889 on Mar. 19, 2014, consisting of 4 pages.

* cited by examiner

WORKING SYSTEM FOR FLOATING STRUCTURE, FLOATING STRUCTURE, WORKING SHIP, AND WORKING METHOD FOR FLOATING STRUCTURE

TECHNICAL FIELD

The present invention relates to working systems for floating structures, floating structures, working ships and working methods for floating structures. More particularly, the invention pertains to a working system for a floating structure, a floating structure, a working ship and a working method for a floating structure, whereby work such as installation or maintenance of the floating structure can be performed in a stable state.

BACKGROUND ART

In recent years, floating structures of various floating types such as a spar type have been proposed as offshore wind power generation floating structures. A wind power generation device installed in such floating structures includes a mast, a nacelle, and blades. A spar type floating structure is constituted, for example, by a columnar floating body and a ballast, and the floating body erected on the sea by the weight of the ballast is moored by mooring cables (see, e.g., Patent Document 1 and Patent Document 2).

For example, Patent Document 1 discloses a spar type floating structure for wind power generation on the sea, which includes upper and lower lids, a hollow lower floating body having cylindrical precast concrete blocks continuously arranged between the upper and lower lids and joined together by PC steel, a hollow upper floating body having an upper lid and precast concrete blocks which are joined to the lower floating body by PC steel and which are smaller in diameter than the above precast concrete blocks, and a ballast tank joined to the lower surface of the lower floating body by connecting steel pipes.

Floating structures such as the one disclosed in Patent Document 1 are associated with a problem that, while work such as installation or maintenance of a floating structure is performed, the floating structure rolls due to waves, wind or the like, making it difficult to carry out the work. Conventionally, therefore, the floating structure is towed by a working ship to an area where the rolling of the floating structure is small, and work such as installation or maintenance of the floating structure is performed there.

For example, in the Background Art section of Patent Document 2, a method of installing an offshore wind power generation device in a spar type floating body is described in which the spar type floating body is laid down and towed to a place of installation, ballast water is poured into the spar type floating body to erect the floating body, mooring cables connected with anchors are tied to the spar type floating body, and a post, a nacelle and blades are mounted on the spar type floating body.

Also, Patent Document 2 discloses a catamaran in which a storage section for storing a cylindrical spar type floating body in a laid state is formed between two hulls set apart from each other at an appropriate interval and fastened together by a connecting member, an accommodation section for accommodating the spar type floating body in an upright state is formed as a cut in the front part of the connecting member, winches for winding wires, by which the spar type floating body is fixed, are arranged on the hulls on both sides of the accommodation section, and an automatic position maintaining device is installed in one hull. The patent document also discloses a method of installing an offshore wind power generation device, in which a cylindrical spar type floating body in a laid state is stored in the storage section between the hulls of the catamaran, the spar type floating body is towed to a place of installation by the catamaran, a plurality of anchors are suspended from the catamaran, the spar type floating body is rotated about its front end and erected, and after a post, a nacelle and blades are mounted to the spar type floating body, the anchors are connected to the spar type floating body by mooring cables.

PRIOR ART DOCUMENTS

Patent Documents

Patent Document 1: Japanese Laid-open Patent Publication No. 2009-248792
Patent Document 2: Japanese Laid-open Patent Publication No. 2009-13829

SUMMARY OF THE INVENTION

Problems to be Solved by the Invention

In the installation method for an offshore wind power generation device disclosed in Patent Document 2, however, it is necessary to build a dedicated catamaran capable of towing, rotating, and erecting spar type floating bodies, posing a problem of increased costs. Also, when maintenance or the like of the offshore wind power generation device or the floating body needs to be performed, it is difficult to carry out such work with the floating body kept floating (erected). Thus, the spar type floating body needs to be rotated to lie and then towed to a calm sea area, giving rise to a problem that the working efficiency is poor.

The present invention was created in view of the above problems, and an object thereof is to provide a working system for a floating structure, a floating structure, a working ship, and a working method for a floating structure, whereby work such as installation or maintenance of the floating structure can be performed in a stable state.

Means for Solving the Problems

The present invention provides a working system comprising: a floating type floating structure; and a working ship configured to perform at least installation or maintenance of the floating structure, wherein the floating structure includes a column section whose peripheral surface is located at a waterline when the floating structure is floating, a ballast section arranged below the column section, and a flange section arranged at an intermediate portion of the column section, the working ship includes a gripping section capable of engaging with the flange section, the floating structure or the working ship includes a raising/lowering device configured to raise and lower the floating structure or the working ship, and with the gripping section of the working ship engaged with the flange section of the floating structure in a floating state, the floating structure or the working ship is raised or lowered to secure the floating structure to the working ship.

The raising/lowering device is, for example, a ballast adjusting device provided in the ballast section of the floating structure, or a ballast adjusting device provided in the working ship, or a jack capable of raising and lowering the gripping section together with the working ship.

The column section may be slenderer than the ballast section. Also, the ballast section may have a ballast tank to and from which water can be supplied and discharged, and water may be supplied to and discharged from the ballast tank in accordance with lowering and raising by the raising/lowering device. Further, the working ship may include a controller configured to control the supply and discharge of water to and from the ballast tank, and a monitor configured to monitor posture of the floating structure.

The gripping section may have a pronged unit with a recess corresponding in shape to a circumferential half of the peripheral surface of the column section and may be arranged at a bow of the working ship. Also, the gripping section may have an elastic member arranged at a portion thereof where the gripping section comes into contact with the floating structure, or a supporting member configured to restrict horizontal movement of the flange section.

The flange section may be configured so as to be attachable and detachable. The floating structure is, for example, a spar type floating body. Also, the floating structure may have a wind power generation device, wind conditions observation equipment, a solar power generation device, lighting equipment, or radio communication equipment arranged above the column section.

Also, the present invention provides a floating type floating structure comprising: a column section whose peripheral surface is located at a waterline when the floating structure is floating; a ballast section arranged below the column section; and a flange section arranged at an intermediate portion of the column section, wherein the flange section constitutes an engagement section for securing the floating structure in a floating state to a working ship.

The column section may be slenderer than the ballast section. Also, the ballast section may have a ballast tank to and from which water can be supplied and discharged. Further, the flange section may be configured so as to be attachable and detachable. The floating structure is, for example, a spar type floating body. Also, the floating structure may have a wind power generation device, wind conditions observation equipment, a solar power generation device, lighting equipment, or radio communication equipment arranged above the column section.

Further, the present invention provides a working ship for performing at least installation or maintenance of a floating type floating structure, comprising: a gripping section capable of engaging with the floating structure; and a raising/lowering device capable of adjusting height of the gripping section from a water surface, wherein the gripping section is raised relative to the water surface by the raising/lowering device to secure the floating structure in a floating state to the gripping section.

The raising/lowering device is, for example, a ballast adjusting device or jack capable of raising and lowering the gripping section together with the working ship.

The floating structure may have a ballast tank to and from which water can be supplied and discharged, and the working ship may include a controller configured to control the supply and discharge of water to and from the ballast tank and a monitor configured to monitor posture of the floating structure.

The floating structure may include a column section whose peripheral surface is located at a waterline when the floating structure is floating, and the gripping section may have a pronged unit with a recess corresponding in shape to a circumferential half of the peripheral surface of the column section and may be arranged at a bow of the working ship.

The gripping section may have an elastic member arranged at a portion thereof where the gripping section comes into contact with the floating structure, or a supporting member configured to restrict horizontal movement of the floating structure.

The present invention also provides a working method for performing work including at least installation or maintenance of a floating type floating structure on water, comprising: an engaging process of engaging a working ship with part of the floating structure; a securing process of securing the floating structure to the working ship by raising or lowering the floating structure or the working ship; and a working process of carrying out the work with respect to the floating structure.

The working method may further comprise: a releasing process of releasing linkage between the floating structure and the working ship by raising or lowering the floating structure or the working ship; and a retreat process of releasing engagement between the floating structure and the working ship by detaching the working ship from the floating structure.

Advantageous Effects of the Invention

With the working system, floating structure, working ship and working method according to the present invention, the gripping section of the working ship is engaged with the floating structure in a floating state, and the floating structure or the working ship is raised or lowered so that the weight of the floating structure may be borne by the gripping section. Thus, relative displacement between the floating structure and the working ship can be made less likely to occur, and the floating structure can be secured to the working ship. Even while the floating structure is in a floating state, work such as installation or maintenance of the floating structure can be easily performed in a stable state at the floating location without the need to move the floating structure.

DETAILED DESCRIPTION OF THE PREFERRED EMBODIMENTS

Mode for Carrying out the Invention

Figure 1A:
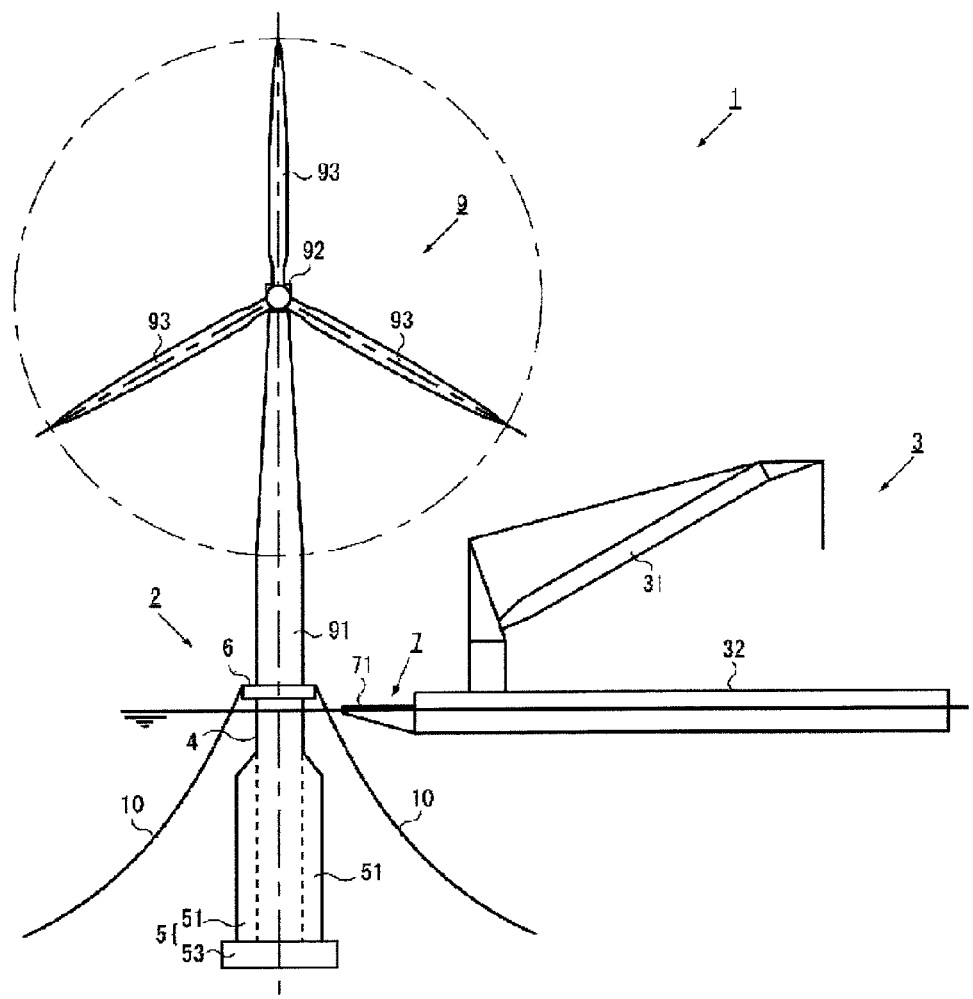
FIG. 1A is a side view illustrating an overall configuration of a working system for a floating structure according to a first embodiment of the present invention.
Figure 1B:
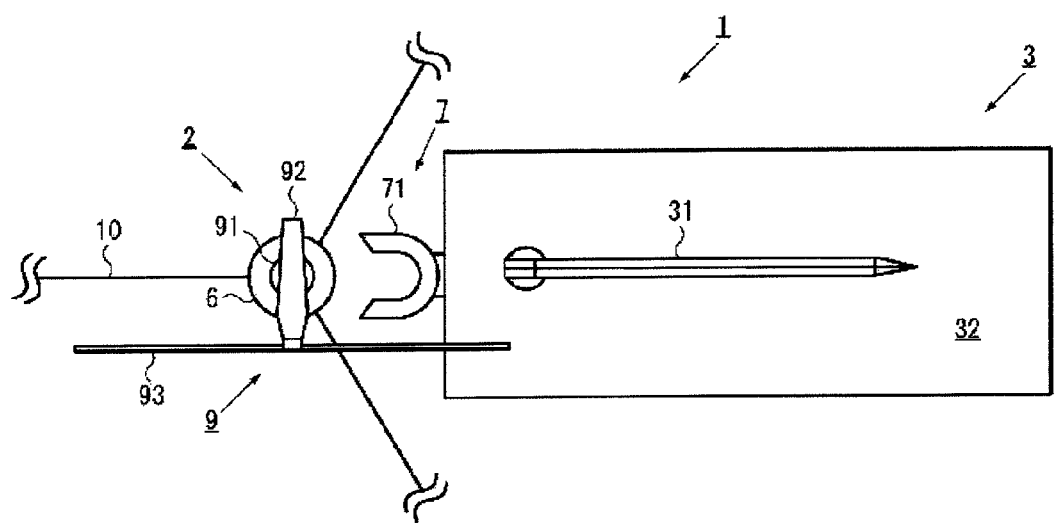
FIG. 1B is a plan view illustrating the overall configuration of the working system according to the first embodiment of the present invention.
Figure 2A:
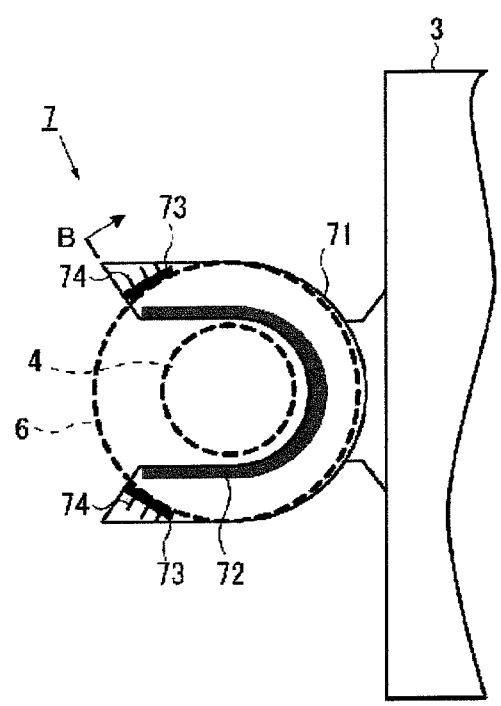
FIG. 2A is an enlarged view of a gripping section of a working ship shown in FIGS. 1A and 1B.
Figure 2B:
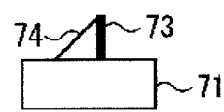
FIG. 2B illustrates the gripping section of the working ship shown in FIGS. 1A and 1B, as viewed from a direction indicated by arrow B in FIG. 2A.
Figure 2C:
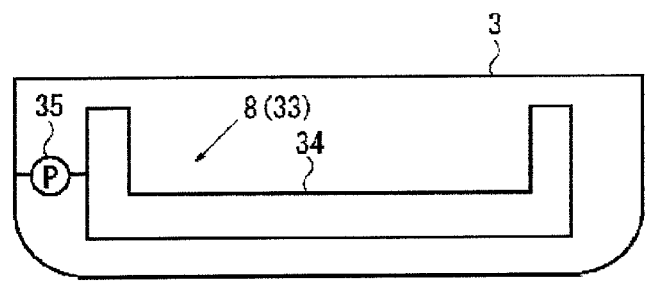
FIG. 2C is a schematic sectional view of the working ship shown in FIGS. 1A and 1B.
Figure 3:
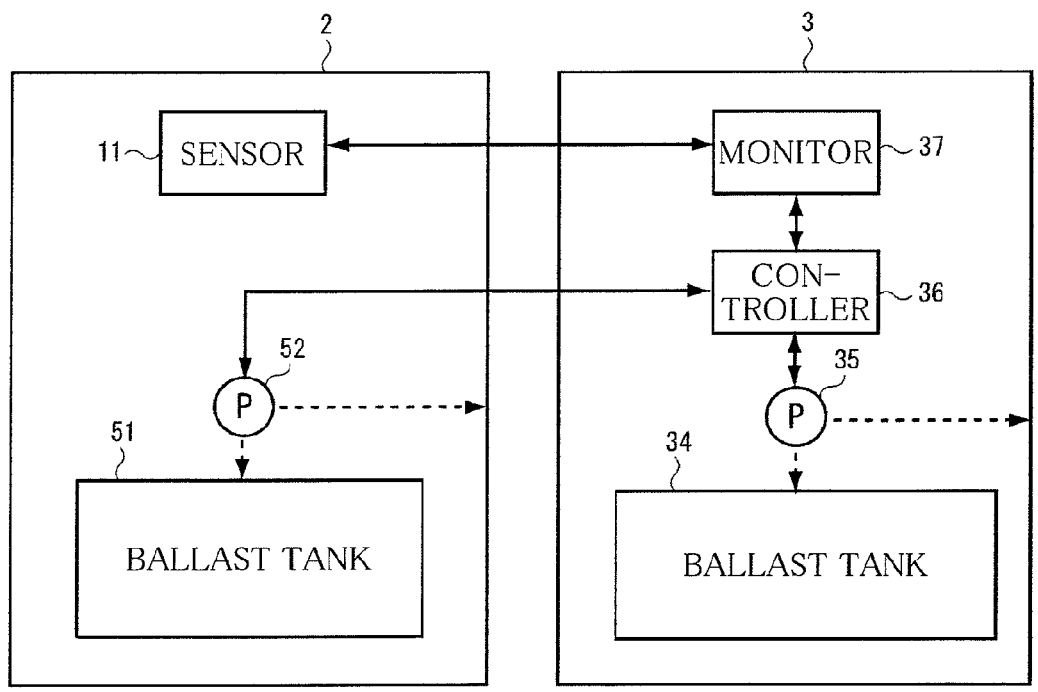
FIG. 3 is a schematic diagram illustrating control of the working system of FIG. 1.

A working system for a floating structure according to a first embodiment of the present invention will be described below with reference to FIGS. 1A to 3, wherein FIGS. 1A and 1B are a side view and a plan view, respectively, illustrating an overall configuration of the working system according to the first embodiment of the present invention, FIGS. 2A to 2C are an enlarged view of a gripping section, a view of the gripping section from a direction indicated by arrow B in FIG. 2A, and a schematic sectional view, respectively, of a working ship shown in FIGS. 1A and 1B, and FIG. 3 is a schematic diagram illustrating control of the working system shown in FIGS. 1A and 1B.

As illustrated in FIGS. 1A to 3, the working system 1 according to the first embodiment of the present invention includes a floating type floating structure 2 and a working ship 3 for performing at least the installation or maintenance of the floating structure 2. The floating structure 2 includes a column section 4 of which the peripheral surface is located at the waterline when the floating structure 2 is floating, a ballast section 5 arranged below the column section 4, and a flange section 6 arranged at an intermediate portion of the column section 4. The working ship 3 includes a gripping section 7 capable of engaging with the flange section 6, and a raising/lowering device 8 for raising and lowering the floating structure 2. With the gripping section 7 of the working ship 3 engaged with the flange section 6 of the floating structure 2 in a floating state, the floating structure 2 and the working ship 3 are raised or lowered to secure the floating structure 2 to the working ship 3.

The floating structure 2, which is a floating type floating structure, has the column section 4, the ballast section 5 and the flange section 6, and the flange section 6 constitutes an engagement section for securing the floating structure 2 in a floating state to the working ship 3. The floating structure 2 is, for example, a spar type floating body. A wind power generation device 9, for example, is arranged above the column section 4. Generally, the floating structure 2 is erected in and above the water by the weight of the ballast section 5 and the buoyancy force of the column section 4, and is moored by mooring cables 10. The floating structure 2 is not limited to a spar type floating body and may be some other floating type floating structure, such as a semisubmersible type, barge type, or tension leg type.

The column section 4 generally has a hollow cylindrical shape because the column section 4 is used to impart buoyancy to the floating structure 2 and is exposed to water. Also, the column section 4 is slenderer than the ballast section 5. By making the column section 4 slenderer than the ballast section 5, it is possible to mitigate the influence of external force exerted by waves and tidal current, improve dynamic characteristics, and reduce mooring force.

The ballast section 5 serves to adjust the buoyancy force of the floating structure 2. Specifically, the ballast section 5 has a ballast tank 51 to and from which water is supplied and discharged in accordance with lowering and raising by the raising/lowering device 8. Water is supplied to and discharged from the ballast tank 51 by using, for example, a pump 52 or the like, as illustrated in FIG. 3. By adjusting the amount of water supplied to or discharged from the ballast tank 51, it is possible to adjust the weight applied to the floating structure 2. Also, the ballast section 5 has a fixed ballast 53 which is located at the bottom when the floating structure 2 is in an upright position and which serves to apply a fixed weight to the floating structure 2. The draft and posture of the floating structure 2 are controlled by the ballast section 5.

The flange section 6 is arranged at an intermediate portion of the column section 4 and constitutes an engagement section that permits the floating structure 2 in a floating state to be supported by the working ship 3. The flange section 6 has a diameter larger than that of the column section 4 and is configured such that the gripping section 7 of the working ship 3 can be brought into contact with the lower surface of the flange section 6. Also, the flange section 6 is formed so as to be located above the waterline when the floating structure 2 is floating, for example. By locating the flange section 6 higher than the waterline, it is possible to make the flange section 6 less likely to submerge in water when the floating structure 2 is floating, and to improve visibility and working efficiency when the gripping section 7 is engaged with the flange section 6. The width, or diameter, and thickness of the flange section 6 are set appropriately in accordance with conditions such as the weight of the floating structure 2, contents of work, size of the working ship 3, and strength of the gripping section 7. Also, the flange may not necessary be circular in shape and may have a rectangular shape.

The wind power generation device 9 includes, for example, a supporting post 91, a nacelle 92, and blades 93. The supporting post 91 is set up on the flange section 6 and supports the nacelle 92 and the blades 93. The nacelle 92 has an electricity generator, not shown, contained therein and generates electric power as the blades 93 are rotated. The blades 93 are rotated by the force of wind. The wind power generation device 9 may be arranged at a portion of the column section 4 located above the flange section 6 or may be set up on a platform formed at the top of the floating structure 2. The wind power generation device 9 is merely an example of superstructure installed at the top of the floating structure 2, and wind conditions observation equipment such as an anemoscope and an anemometer, a solar power generation device, lighting equipment, radio communication equipment or the like may be installed instead.

The working ship 3, which is a marine vessel used for performing work such as installation or maintenance of the floating type floating structure 2, includes the gripping section 7 and the raising/lowering device 8. The gripping section 7 is raised relative to the surface of water by the raising/lowering device 8, to secure the floating structure 2 in a floating state to the gripping section 7. That is, the working ship 3 is so configured as to be able to support the floating structure 2 in a floating state. The working ship 3 includes, besides the gripping section 7 capable of engaging with the flange section 6, a crane 31 installed on board the working ship 3, and a storage space 32 for materials used for work such as installation or maintenance of the floating structure 2. In the figures, a driving mechanism of the working ship 3 such as a main engine, is omitted.

The gripping section 7 is used to hold and support the flange section 6 of the floating structure 2. As illustrated in FIGS. 1A, 1B and 2A, for example, the gripping section 7 has a pronged unit 71 with a recess corresponding in shape to a circumferential half of the peripheral surface of the column section 4 and is arranged at the bow of the working ship 3. Also, as illustrated in FIG. 2A, the gripping section 7 may include an elastic member 72 arranged at a portion thereof where the gripping section 7 comes into contact with the floating structure 2, and supporting members 73 for restricting horizontal movement of the flange section 6. The elastic member 72 serves as an antislip, shock-absorbing member when fitted on the junction between the column section 4 and the flange section 6. Alternatively, the elastic member 72 may be arranged over the entire upper surface of the pronged unit 71. As illustrated in FIG. 2B, each supporting member 73 projects from the pronged unit 71, has a flat surface which comes into contact with the peripheral surface of the column section 4, and serves as an antislip member for the flange section 6. A reinforcing member 74 may be arranged at the back of each supporting member 73 as needed.

The configuration of the gripping section 7 (pronged unit 71) is not limited to the illustrated one. The gripping section 7 may be configured so as to be rotatable or extendable and contractible with respect to the working ship 3, or may be configured such that the pronged unit 71 can be opened and closed. The shape of the gripping section 7 is also not limited to the illustrated one. The gripping section 7 may have any shape insofar as its structure and strength enable the gripping section 7 to engage with and support the floating structure 2.

The raising/lowering device 8 is capable of raising and lowering the working ship 3 with which the floating structure 2 is engaged, and also can raise and lower the floating structure 2 at the same time. As illustrated in FIG. 2C, the raising/lowering device 8 is a ballast adjusting device 33 arranged in the working ship 3, for example. The ballast adjusting device 33 includes a ballast tank 34 arranged inside the working ship 3, and a pump 35 for supplying and discharging water to and from the ballast tank 34. The ballast adjusting device 33 adjusts the amount of water in the ballast tank 34 by using the pump 35, to adjust the draft of the working ship 3 and thereby raise or lower the gripping section 7 together with the working ship 3. Consequently, the floating structure 2 engaged by the gripping section 7 is also raised or lowered at the same time.

The working ship 3 may be equipped, as illustrated in FIG. 3, with a controller 36 for controlling the supply/discharge of water to/from the ballast tank 51 of the floating structure 2, and a monitor 37 for monitoring the posture of the floating structure 2. The controller 36 also controls the supply/discharge of water to/from the ballast tank 34 of the working ship 3. Specifically, the controller 36 controls the pumps 52 and 35 through wireless or wire communication, to supply or discharge water to or from the respective ballast tanks 51 and 34. The floating structure 2 includes a sensor 11 for detecting the posture (inclination) of the floating structure 2. The monitor 37 receives data indicative of the posture of the floating structure 2 from the sensor 11 through wireless or wire communication, and presents the information to the operator. Feedback control may be executed in such a manner that the monitor 37 sends the data indicative of the posture of the floating structure 2 to the controller 36, which then controls the supply/discharge of water to/from the ballast tanks 34 and 51 in accordance with the received data.

Figure 4A:
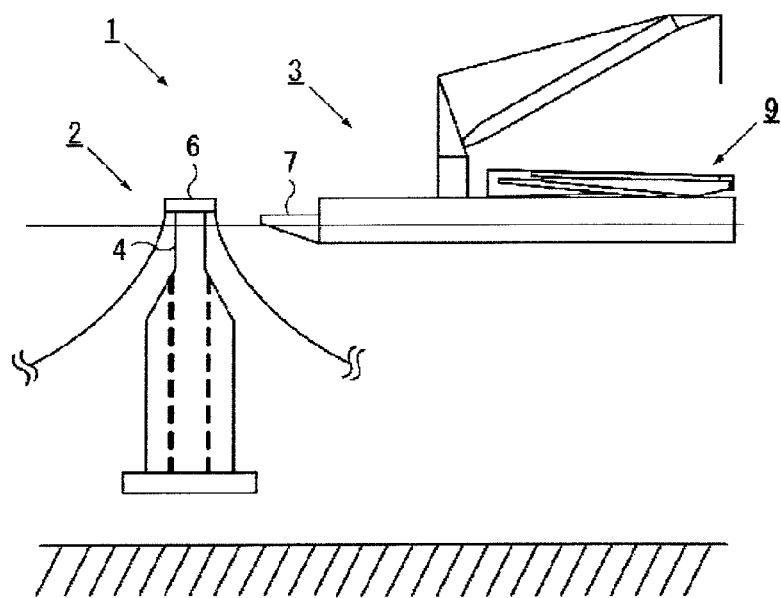
FIG. 4A illustrates a working method for a floating structure, using the working system shown in FIGS. 1A and 1B, and illustrates a state before work.
Figure 4B:
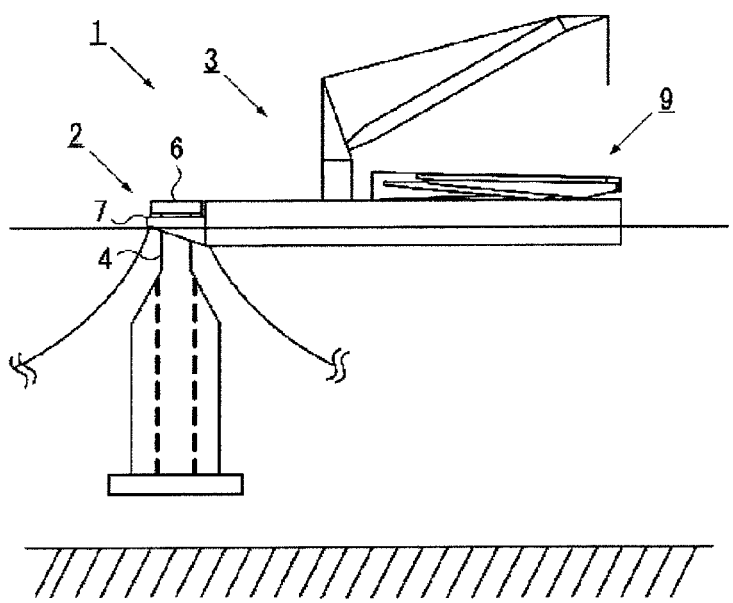
FIG. 4B illustrates the working method using the working system shown in FIGS. 1A and 1B and illustrates an engaging process.
Figure 4C:
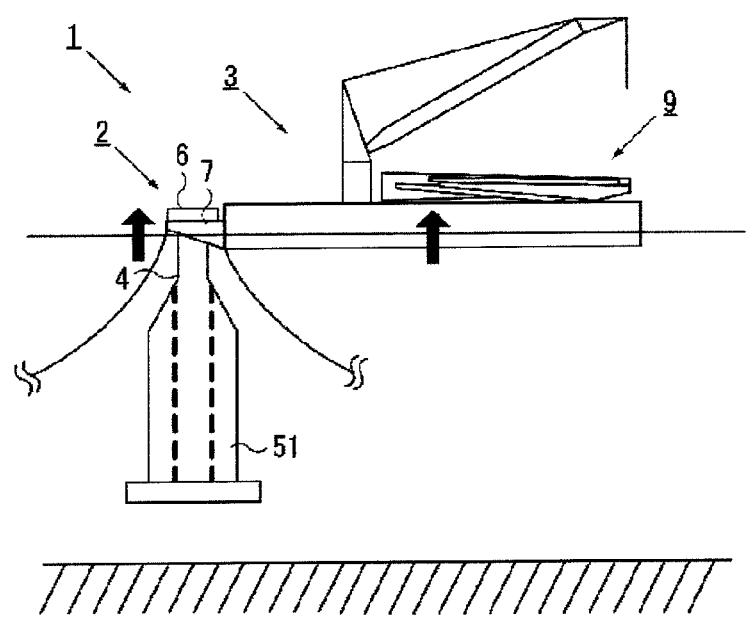
FIG. 4C illustrates the working method using the working system shown in FIGS. 1A and 1B and illustrates a securing process.
Figure 5A:
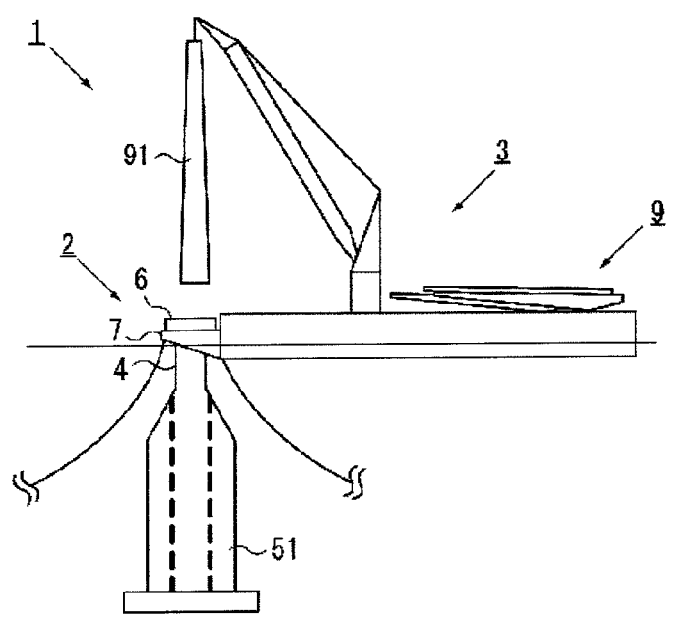
FIG. 5A illustrates the working method using the working system shown in FIGS. 1A and 1B and illustrates a working process.
Figure 5B:
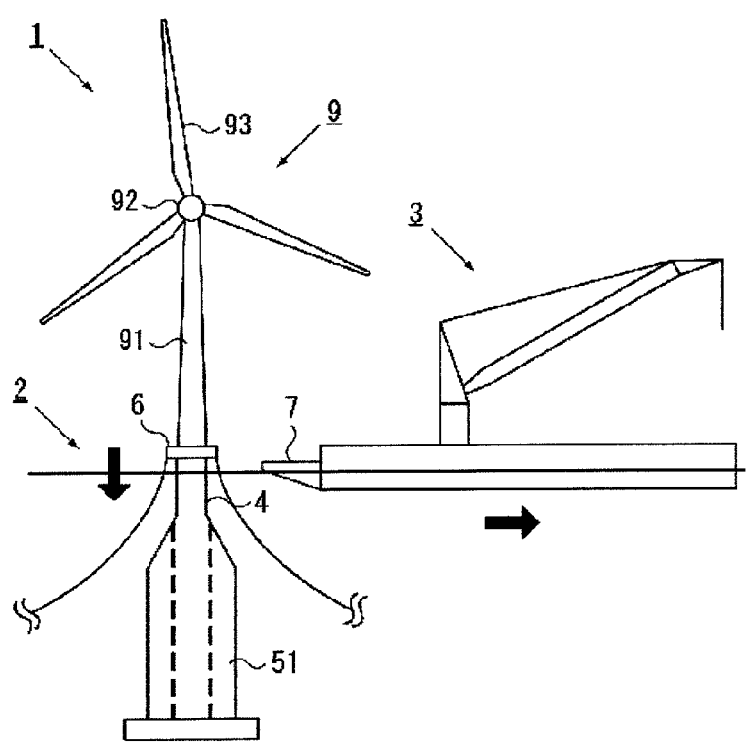
FIG. 5B illustrates the working method using the working system shown in FIGS. 1A and 1B and illustrates a releasing process and a retreat process.

A working method using the aforementioned working system 1 will be now described with reference to FIGS. 4A to 4C, 5A and 5B. FIGS. 4A to 4C illustrate the working method using the working system illustrated in FIG. 1, wherein FIG. 4A illustrates a state before work, FIG. 4B illustrates an engaging process, and FIG. 4C illustrates a securing process. FIGS. 5A and 5B also illustrate the working method using the working system illustrated in FIG. 1, wherein FIG. 5A illustrates a working process, and FIG. 5B illustrates a releasing process and a retreat process.

As illustrated in FIGS. 4A to 4C, 5A and 5B, the working method according to the present invention is a method for performing work including at least the installation or maintenance of the floating type floating structure 2 on the water and includes the engaging process for engaging the working ship 3 with part of the floating structure 2, the securing process for securing the floating structure 2 to the working ship 3 by raising the floating structure 2 and the working ship 3, and the working process for carrying out the work, such as installation or maintenance, with respect to the floating structure 2. Also, as illustrated in FIGS. 5A and 5B, the working method may further include the releasing process for releasing the linkage between the floating structure 2 and the working ship 3 by lowering the floating structure 2 and the working ship 3, and the retreat process for releasing the engagement between the floating structure 2 and the working ship 3 by detaching the working ship 3 from the floating structure 2. In the following, the work of installing the wind power generation device 9 at the top of the floating structure 2 will be explained.

Before the work, the floating structure 2 without the wind power generation device 9 is floating, as shown in FIG. 4A. The floating structure 2, which is of a floating type, is laid down and towed to a place of installation by the working ship 3 or other tow vessel, and at the place of installation, the floating structure 2 is set upright through adjustment of the ballast and is moored. Also, the working ship 3 carries thereon the supporting post 91, the nacelle 92 and the blades 93 which are used to construct the wind power generation device 9.

As illustrated in FIG. 4B, the engaging process is a process whereby the working ship 3 is engaged with the floating structure 2. Specifically, the working ship 3 is moved close to the floating structure 2, and the gripping section 7 of the working ship 3 is engaged with the column section 4 of the floating structure 2.

The securing process is a process for securing the floating structure 2 to the working ship 3 by raising the working ship 3, as illustrated in FIG. 4C. Specifically, water is discharged from the ballast tank 34 (see FIG. 2C) of the working ship 3, to decrease the draft of the working ship 3 and thereby lift the flange section 6 by the gripping section 7. The weight of the floating structure 2 is borne by the gripping section 7 to secure the floating structure 2 and the working ship 3 to each other so that relative displacement of the two may be unlikely to occur. At this time, the ballast tank 51 of the floating structure 2 and the ballast tank 34 of the working ship 3 may be controlled using the controller 36 and the monitor 37, shown in FIG. 3, so that the floating structure 2 may not be displaced or rotated.

As illustrated in FIG. 5A, the working process is a process for installing the wind power generation device 9 at the top of the floating structure 2. Specifically, using the crane 31 or the like, the supporting post 91, the nacelle 92 and the blades 93 are successively installed on the flange section 6 of the floating structure 2 secured to the working ship 3. Since, at this time, the floating structure 2 is supported by and secured to the working ship 3, it is possible to restrain relative displacement between the floating structure 2 and the working ship 3 from taking place at the floating location of the floating structure 2. Also, in cases where the facilities of the working ship 3 such as the crane 31 are used, the component parts can be easily positioned and thus can be installed in a stable state. Further, the transfer of workers and the conveyance of component parts and the like from the working ship 3 to the floating structure 2 can be safely and smoothly carried out.

The releasing process is a process for releasing the linkage between the gripping section 7 of the working ship 3 and the flange section 6 of the floating structure 2, as illustrated in FIG. 5B. Specifically, water is supplied to the ballast tank 34 (see FIG. 2C) of the working ship 3 to increase the draft of the working ship 3 and thereby release the gripping section 7 from the weight of the floating structure 2 so that the floating structure 2 may resume a floating state. At this time, the ballast tank 51 of the floating structure 2 and the ballast tank 34 of the working ship 3 may be controlled by the controller 36 and the monitor 37, shown in FIG. 3, so that the floating structure 2 may not fall.

As illustrated in FIG. 5B, the retreat process is a process in which the working ship 3 retreats from the floating structure 2. Specifically, the column section 4 of the floating structure 4 is detached from the gripping section 7 of the working ship 3 by moving the working ship 3 away from the floating structure 2.

In the case of performing, for example, the maintenance of the wind power generation device 9 installed as illustrated in FIG. 5B, processes similar to the engaging and securing processes shown in FIGS. 4B and 4C, respectively, may be carried out to secure the floating structure 2 equipped with the wind power generation device 9 to the working ship 3, and after the relative displacement between the floating structure 2 and the working ship 3 is restricted, desired work such as maintenance may be performed.

With the aforementioned working system and method for a floating structure according to the first embodiment, the gripping section 7 of the working ship 3 is engaged with the floating structure 2 in a floating state, and the floating structure 2 and the working ship 3 are raised so that the weight of the floating structure 2 may be borne by the gripping section 7. Thus, relative displacement between the floating structure 2 and the working ship 3 can be made less likely to occur, and the floating structure 2 can be secured to the working ship 3. Even while the floating structure 2 is in a floating state, work such as installation or maintenance of the floating structure 2 can be easily performed in a stable state at the floating location without the need to move the floating structure 2.

Figure 6A:
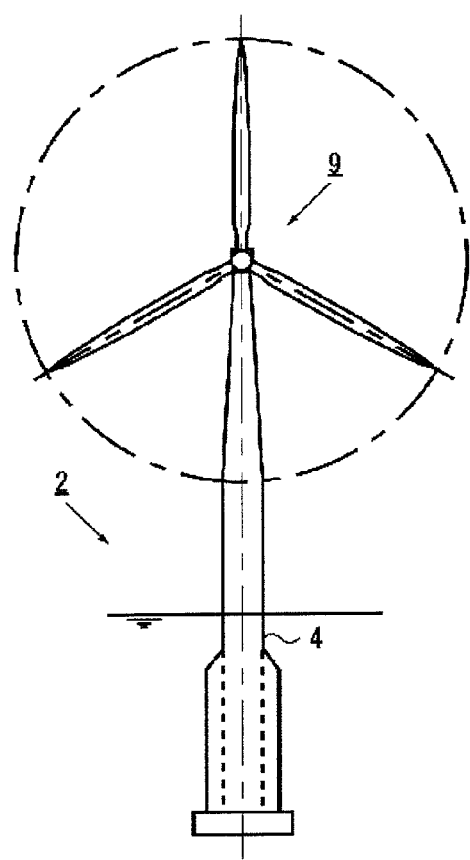
FIG. 6A illustrates a working system for a floating structure according to a second embodiment of the present invention, and illustrates a state before a flange section is attached.
Figure 6B:
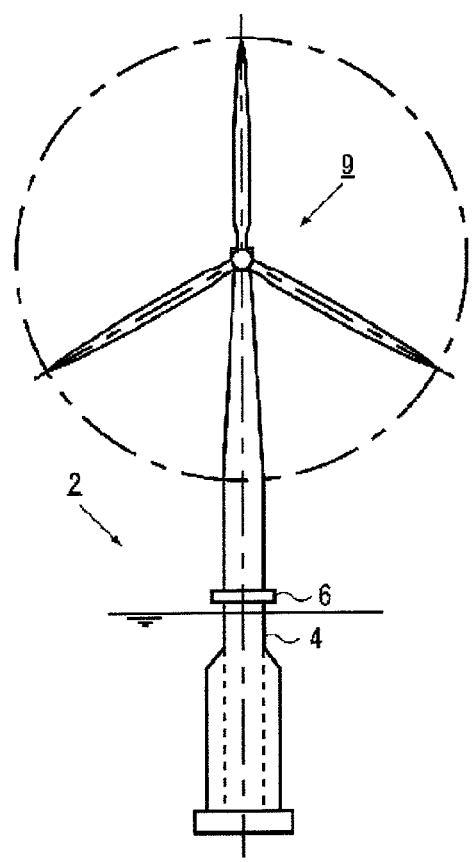
FIG. 6B illustrates the working system according to the second embodiment of the present invention and illustrates the attachment of the flange section.
Figure 6C:
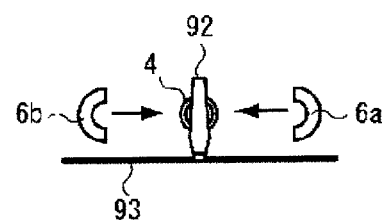
FIG. 6C illustrates the working system according to the second embodiment of the present invention and illustrates a state after the flange section is attached.
Figure 7A:
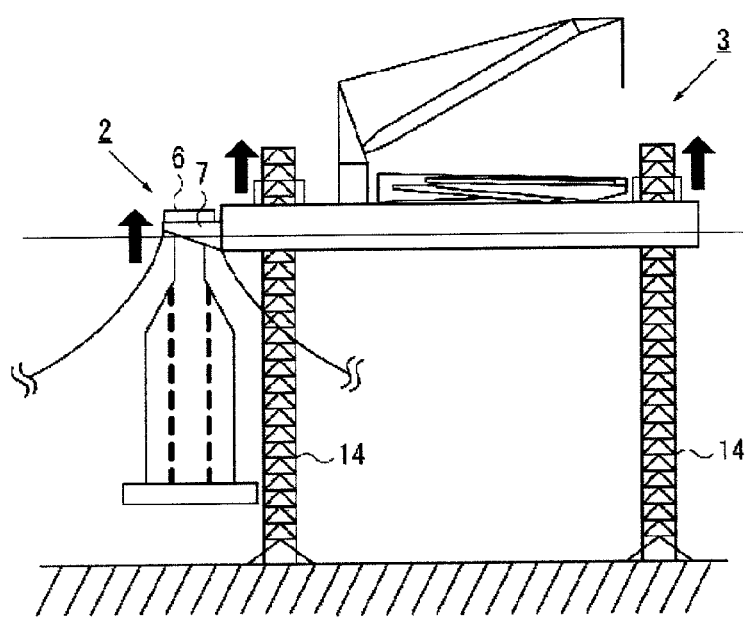
FIG. 7A illustrates a working system for a floating structure according to a third embodiment of the present invention.
Figure 7B:
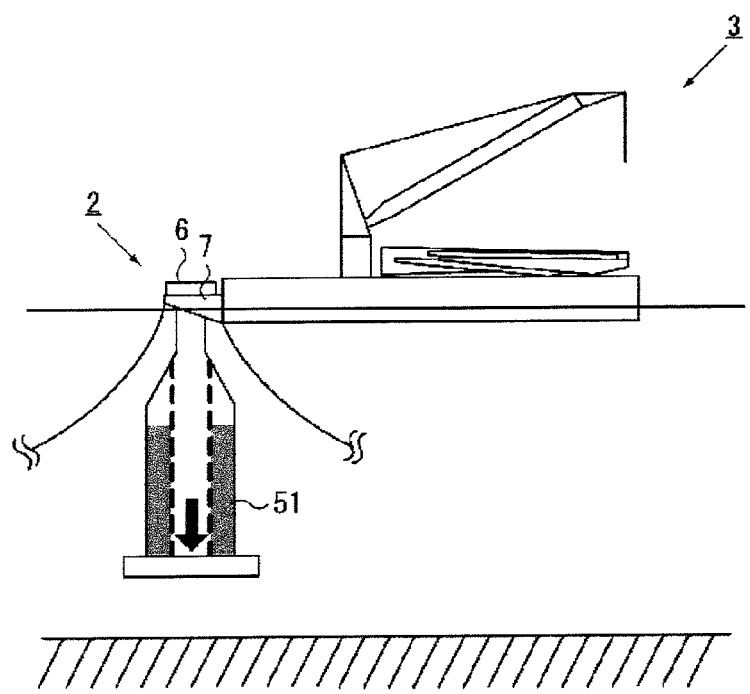
FIG. 7B illustrates a working system for a floating structure according to a fourth embodiment of the present invention.

Working systems 1 for a floating structure according to other embodiments of the present invention will be now described. FIGS. 6A to 6C illustrate the working system according to a second embodiment of the present invention, wherein FIG. 6A illustrates a state before a flange section is attached, FIG. 6B illustrates the attachment of the flange section, and FIG. 6C illustrates a state after the flange section is attached. FIGS. 7A and 7B illustrate the working systems according to the other embodiments of the present invention, wherein FIG. 7A illustrates a third embodiment, and FIG. 7B illustrates a fourth embodiment. In these figures, like reference numerals refer to like elements of the first embodiment, and description of identical elements is omitted.

In the second embodiment illustrated in FIGS. 6A to 6C, a flange section 6 is attached to an existing floating structure 2. That is, the flange section 6 may be of an attachable/detachable type, and the floating structure 2 not provided with the flange section 6, as shown in FIG. 6A, may be mounted with the flange section 6, as shown in FIG. 6B, so that the floating structure 2 can be secured to the working ship 3. The flange section 6 is made up of, for example, two flange halves 6a and 6b, as shown in FIG. 6C, and the flange halves 6a and 6b are combined together to be connected to the column section 4.

In the third embodiment illustrated in FIG. 7A, the raising/lowering device 8 is replaced by jacks 14 capable of raising and lowering the gripping section 7 together with the working ship 3. Specifically, the jacks 14 are set up on the seafloor and configured to raise and lower the working ship 3 by motors, not shown, so that the draft of the working ship 3 can be adjusted.

In the fourth embodiment illustrated in FIG. 7B, the ballast of the floating structure 2 is adjusted, instead of raising and lowering the working ship 3, to secure the floating structure 2 to the working ship 3. Specifically, in the engaging process, water is supplied to the ballast tank 51 of the floating structure 2 with the gripping section 7 of the working ship 3 engaged with the floating structure 2, to increase the weight of the floating structure 2 and thereby lower (increase the draft of) the floating structure 2. As a result, the flange section 6 is pressed against the gripping section 7, whereby the floating structure 2 is secured to the working ship 3. At this time, the ballast tank 51 of the floating structure 2 and the ballast tank 34 of the working ship 3 may be controlled by the controller 36 and the monitor 37, shown in FIG. 3, so that the floating structure 2 may not fall.

The present invention is not limited to the foregoing embodiments, and various modifications can of course be made thereto without departing from the scope and spirit of the invention.

EXPLANATION OF REFERENCE SIGNS

1: working system for floating structure
2: floating structure
3: working ship
4: column section
5: ballast section
6: flange section
7: gripping section
8: raising/lowering device
9: wind power generation device
14: jack
33: ballast adjusting device
34: ballast tank
36: controller
37: monitor
71: pronged unit
72: elastic member
73: supporting member

The invention claimed is:
1. A working system comprising:
a floating type floating structure; and
a working ship configured to perform at least installation or maintenance of the floating structure, wherein:
the floating structure includes a column section whose peripheral surface is located at a waterline when the floating structure is floating, a ballast section arranged below the column section, and a flange section arranged at an intermediate portion of the column section,
the working ship includes a gripping section capable of engaging with an underside of the flange section,
the floating structure includes a raising/lowering device configured to raise and lower the floating structure, and
with the gripping section of the working ship engaged with the underside of the flange section of the floating structure in a floating state, the floating structure is lowered such that weight of the floating structure is borne by the gripping section via the flange section, to secure the floating structure to the working ship.

2. The working system according to claim 1, wherein the raising/lowering device is a ballast adjusting device provided in the ballast section of the floating structure.

3. The working system according to claim 1, wherein the column section is slenderer than the ballast section.

4. The working system according to claim 1, wherein the ballast section has a ballast tank to and from which water can be supplied and discharged, and water is supplied to and discharged from the ballast tank in accordance with lowering and raising by the raising/lowering device.

5. The working system according to claim 4, wherein the working ship includes a controller configured to control the supply and discharge of water to and from the ballast tank, and a monitor configured to monitor posture of the floating structure.

6. The working system according to claim 1, wherein the gripping section has a pronged unit with a recess corresponding in shape to a circumferential half of the peripheral surface of the column section and is arranged at a bow of the working ship.

7. The working system according to claim 1, wherein the gripping section has an elastic member arranged at a portion thereof where the gripping section comes into contact with the floating structure, or a supporting member configured to restrict horizontal movement of the flange section.

8. The working system according to claim 1, wherein the flange section is configured so as to be attachable and detachable.

9. The working system according to claim 1, wherein the floating structure is a spar type floating body.

10. The working system according to claim 1, wherein the floating structure has a wind power generation device, wind conditions observation equipment, a solar power generation device, lighting equipment, or radio communication equipment arranged above the column section.

11. A working method for performing work including at least installation or maintenance of a floating type floating structure on water, the floating structure having a column section whose peripheral surface is located at a waterline when the floating structure is floating, a ballast section arranged below the column section, and a flange section arranged at an intermediate portion of the column section, the working method comprising:
- an engaging process of engaging a gripping section of a working ship with an underside of the flange section of the floating structure;
- a securing process of securing the floating structure to the working ship by lowering the floating structure such that weight of the floating structure is borne by the gripping section via the flange section; and
- a working process of carrying out the work including at least installation or maintenance of the floating structure.

12. The working method according to claim 11, further comprising:
- a releasing process of releasing linkage between the floating structure and the working ship by raising the floating structure; and
- a retreat process of releasing engagement between the floating structure and the working ship by detaching the working ship from the floating structure.

* * * * *